March 8, 1955  R. J. FORTHOFER  2,703,509
TURRET MECHANISM FOR AN AIRCRAFT
Filed Jan. 24, 1949
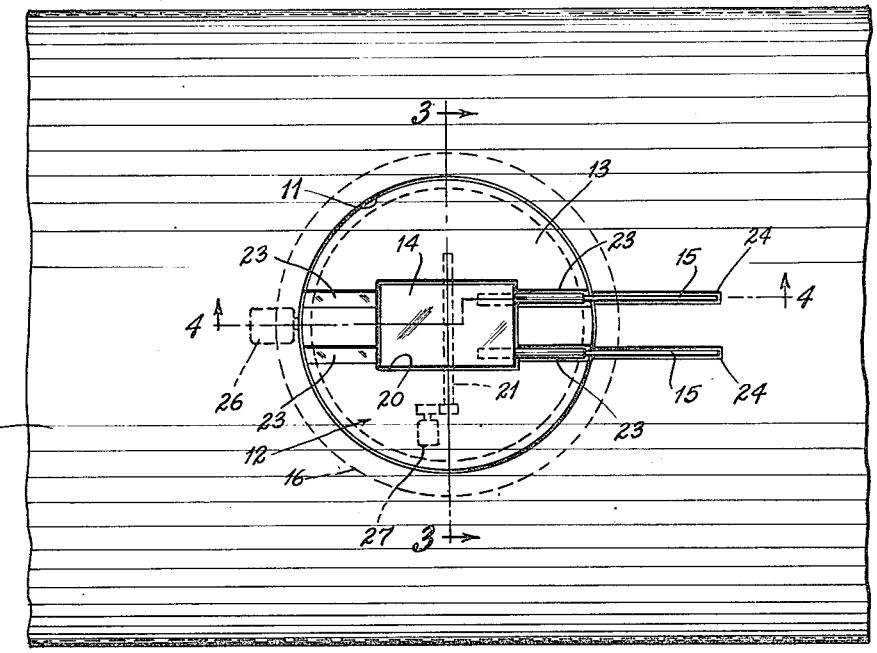
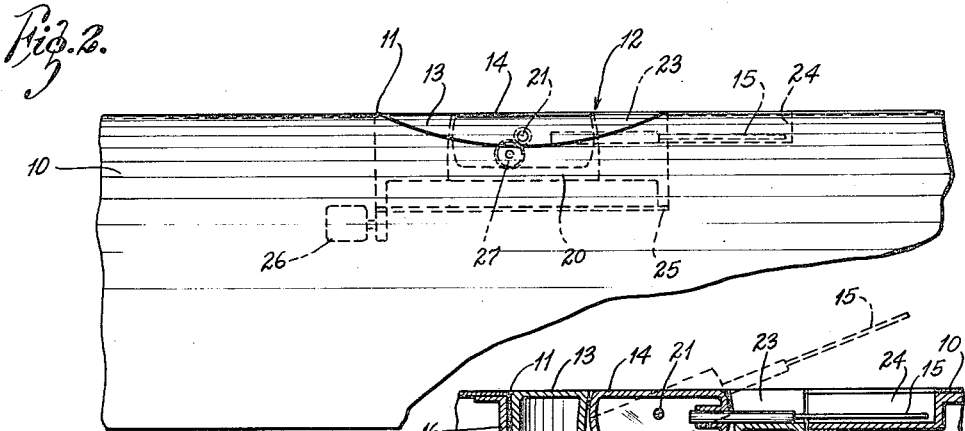
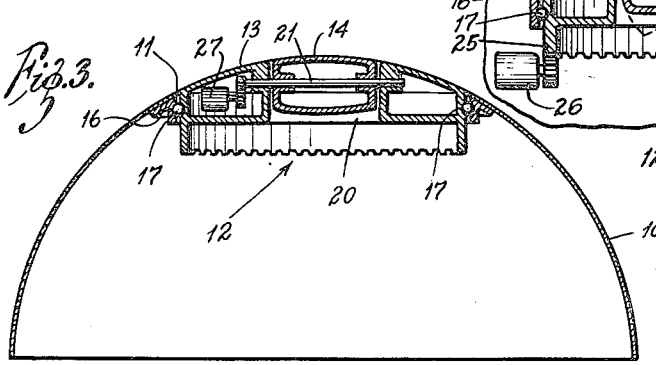
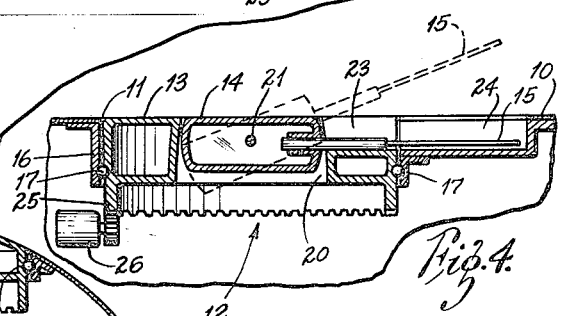
INVENTOR:
ROBERT J. FORTHOFER,
BY Rogers & Egell
ATTORNEYS.

2,703,509

TURRET MECHANISM FOR AN AIRCRAFT

Robert J. Forthofer, Ferguson, Mo., assignor to The Emerson Electric Manufacturing Company, St. Louis, Mo., a corporation of Missouri Application January 24, 1949, Serial No. 72,470

1 Claim. (Cl. 89—37.5)

The present invention relates to a turret mechanism, and particularly to a turret mechanism for mounting guns on aircraft or submarine for movement to a substantially full range of positions in one hemisphere.

It is an object of the invention to provide such a turret that is flush-mounted into the fuselage or other equivalent part of the aircraft, whereby it affords a minimum of drag.

A further object of the invention is to provide such a flush-mounted turret that operates to change the elevation of the guns and also to change the azimuth of the guns.

A further object of the invention is to provide such a turret with suitable means for stowing the guns within the limits of the fuselage.

Other objects will appear from the description to follow.

In the drawings:

Fig. 1 is a plan view of a section of a fuselage, with the turret mounting therein;

Fig. 2 is a partial side elevation of the same;

Fig. 3 is a transverse section on the line 3—3 of Fig. 1; and

Fig. 4 is a longitudinal section taken on the line 4—4 of Fig. 1.

The drawings show a portion of a fuselage of an airplane, generally designated by the reference numeral 10. This fuselage is convex in shape on its upper part, and is here illustrated for convenience as being arcuate. Within this convex portion, there is a circular opening 11, into which the turret, generally designated at 12, is fitted.

The turret itself includes a larger circular member 13 that is adapted to rotate about its axis, and within this circular member there is a rockable portion 14 upon which the guns 15 are adapted to be mounted. The rockable gun supporting element 14 is supported on the disc or wafer 13 so as to rotate with it.

In the type illustrated in the drawings, the circular member 13 is inserted into the opening 11, and is therein held by bearings between the member 13 and a tubular flange-like member 16. This tubular member may be secured to the fuselage skin by a suitable connecting arrangement. A bearing is diagrammatically illustrated at 17, it being of a type that will support the turret 12 for rotation about the axis of the circular member 13, and to prevent the turret 12 from coming out of the fuselage or falling down into the same. Such bearings are well known and it is not necessary to illustrate them in detail.

The member 13 has at its central part a generally rectangular opening 20. This opening receives the gun support 14 which is mounted about an axis 21 that is transverse to the fuselage, and is preferably substantially medial of the gun support 14. The shape of the gun support 14 may vary from that shown, but should be symmetrical about the axis 21. The gun support 14 is adapted to rock 180 degrees about the axis 21. The member 13 has gun slot portions 23 in its opposite ends, and at least one end of the fuselage has complementary grooves 24. These grooves are provided so that the guns 15 may be stowed away when the gun support is in a horizontal position as is shown in Fig. 4.

Suitable power means may be employed for rotating the turret 12. Such a means is here illustrated as consisting of a depending gear portion 25 that extends downwardly from the member 13 to be engaged by a hydraulic motor diagrammatically shown at 26. Such motors are conventionally operated by remote control. The gun support element 14 similarly may be rocked by the motor 27 that is geared or otherwise connected to the shaft 21, as illustrated in Fig. 3.

It will be seen that the whole turret 12 has its upper surface shaped to lie flush with and be complementary to the adjacent fuselage contour when the guns are stowed in the gun slots 23, 24. To this end, the upper surface of the member 13 is curved as shown in Fig. 3, and the gun support 14 is similarly curved. The under surface of the gun support 14 is curved in a like manner as illustrated in Fig. 3, so that, when the gun support is turned 180 degrees to present its other surface upwardly, it likewise will be contoured to complement the adjacent parts of the turret and fuselage.

In use, the guns may be elevated by actuation of the motive means illustrated at 27. Such elevation is illustrated in dotted lines in Fig. 4, and it withdraws the guns 15 from the gun slots 23, 24. When the guns are withdrawn from the gun slots, the turret 12 may be rotated about the axis of the wafer 13 by operation of the motive means illustrated at 26. If the entire turret is rotated 180 degrees about the axis of the wafer 13, the guns may be stowed because of the fact that the slots 23 are provided at diametrically opposite positions on the member 13.

It will be seen that this form of turret arrangement affords the opportunity of stowing the guns in a manner to offer a minimum of drag on the travel of the craft. Yet a fully adequate range of movement of the guns is provided so that they may be fired in every direction feasible from location in a fuselage.

Where a reference is made in the foregoing to a fuselage, it will be understood that, unless the claim specifically indicates otherwise, it comprehends other parts of an aircraft or submarine, etc. Also, when the term "vertical axis" is used, it is intended to indicate an axis that is normal to the surface of the fuselage, whether the particular axis is vertical to the ground or not. The term "transverse axis" means an axis that is at right angles to the foregoing axis, and is here illustrated by the axis 21.

What is claimed is:

In a turret construction for an aircraft or submarine part having a contoured surface and an opening through such surface, a first, circular member mounted for rotation in said opening, about its own axis, the first member having an opening therethrough, inward from its periphery, and a gun support element mounted within said opening for rocking about an axis extending across the opening, the upper surfaces of the circular member and the gun supporting element being contoured to constitute parts of a continuous, unbroken, convex surface area, the gun supporting element being rockable 180° about its axis, and having its upper and lower surfaces contoured symmetrically about said axis, the said upper and lower surfaces being of the same shape so that when the element is overturned, it can present the same contour as when it is upright, gun slot means extending outward, in the upper surface of the circular member, from one end of the gun support element, and similar gun slot means extending from the opposite end of the gun supporting element.

References Cited in the file of this patent

UNITED STATES PATENTS

| | | |
|---|---|---|
| 2,336,557 | McCallister | Dec. 14, 1943 |
| 2,348,470 | Growald | May 9, 1944 |

OTHER REFERENCES

Pages 79, 80, and 81 of January 1, 1945 issue of "Aero Digest" magazine.